US011835385B2

(12) United States Patent
Pandraud et al.

(10) Patent No.: US 11,835,385 B2
(45) Date of Patent: Dec. 5, 2023

(54) GEOMETRICALLY AND SPECTRALLY RESOLVED ALBEDOMETERS FOR BIFACIAL MODULES

(71) Applicant: TECHNISCHE UNIVERSITEIT DELFT, Delft (NL)

(72) Inventors: Gregory Pandraud, Delft (NL); Miroslav Zeman, Delft (NL); Olindo Isabella, Delft (NL); Stefaan Gustaaf Mariette Heirman, Delft (NL); Hesan Ziar, Delft (NL)

(73) Assignee: TECHNISCHE UNIVERSITEIT DELFT, Delft (NL)

( * ) Notice: Subject to any disclaimer, the term of this patent is extended or adjusted under 35 U.S.C. 154(b) by 0 days.

(21) Appl. No.: 17/760,493

(22) PCT Filed: Feb. 5, 2021

(86) PCT No.: PCT/NL2021/050076
§ 371 (c)(1),
(2) Date: Aug. 10, 2022

(87) PCT Pub. No.: WO2021/162544
PCT Pub. Date: Aug. 19, 2021

(65) Prior Publication Data
US 2023/0125617 A1   Apr. 27, 2023

(30) Foreign Application Priority Data
Feb. 12, 2020   (NL) .................................... 2024882

(51) Int. Cl.
*G01J 1/42*   (2006.01)
*G01W 1/12*   (2006.01)

(52) U.S. Cl.
CPC ............. *G01J 1/4228* (2013.01); *G01W 1/12* (2013.01); *G01J 2001/4266* (2013.01)

(58) Field of Classification Search
CPC .. G01J 2001/448; G01J 1/44; G01J 2001/428; G01J 1/4214; G01J 2001/4266; G01J 1/42; G01J 1/4228; G01W 1/12
See application file for complete search history.

(56) References Cited

U.S. PATENT DOCUMENTS

| 11,063,556 | B1 * | 7/2021 | Piatt .......................... H02S 50/00 |
| 2021/0231490 | A1 * | 7/2021 | Gostein ....................... G01J 1/06 |
| 2022/0099483 | A1 * | 3/2022 | Gostein ................... H01L 31/04 |
| 2022/0311380 | A1 * | 9/2022 | Piatt ........................ H02S 50/10 |

OTHER PUBLICATIONS

Anonymous, "Albedo Measurement for Bifacial PV Modules", Kipp & Zonen, Jul. 12, 2018, 4 pages.
Anonymous, "How to Measure Albedo for Bifacial PV"; Hukseflux Thermal Sensors, Jan. 1, 2004, 5 pages.
(Continued)

*Primary Examiner* — John R Lee
(74) *Attorney, Agent, or Firm* — AEON Law, PLLC; Adam L. K. Philipp; David Cohen

(57) ABSTRACT

The present invention is in the field of a geometrically and spectrally resolved albedometer for a PV-module, a method of determining characteristics of reflected light, a method of optimizing reflected light performance of a solar cell, and a computer program for geometrically and spectrally resolving light.

13 Claims, 3 Drawing Sheets

(56) References Cited

OTHER PUBLICATIONS

International Search Report and Written Opinion for PCT Patent Application No. PCT/NL2021/050076 dated May 25, 2021, 10 pages.
Lucht et al., "A Comparison of Satellite-Derived Spectral Albedos to Ground-Based Broadband Albedo Measurements Modeled to Satellite Spatial Scale for a Semidesert Landscape", Remote Sensing of Environment, vol. 74, 2000, pp. 85-98. (No month).
Pelaez et al., "Comparison of Bifacial Solar Irradiance Model Predictions with Field Validation"; IEEE Journal of Photovoltaics, vol. 9, No. 1, Jan. 2019, pp. 82-88.

* cited by examiner

GEOMETRICALLY AND SPECTRALLY RESOLVED ALBEDOMETERS FOR BIFACIAL MODULES

RELATED APPLICATIONS

This application is a national entry of PCT International Patent Application No. PCT/NL2021/050076, filed Feb. 5, 2021, in the name of "TECHNISCHE UNIVERSITEIT DELFT" [NL], which PCT application claims the benefit of priority of Netherlands Patent Application Serial No. 2024882, filed Feb. 12, 2020, in the name of "TECHNISCHE UNIVERSITEIT DELFT" [NL]. The entire contents of the above-referenced applications and of all priority documents referenced in the Application Data Sheet filed herewith are hereby incorporated by reference for all purposes.

FIELD OF THE INVENTION

The present invention is in the field of a geometrically and spectrally resolved albedometer for a PV-module, a method of determining characteristics of reflected light, a method of optimizing reflected light performance of a solar cell, and a computer program for geometrically and spectrally resolving light.

BACKGROUND OF THE INVENTION

The present invention is in the field of resolving light, which may be direct sun light or reflected light. Light typically consists of a distribution of wavelength of the electromagnetic spectrum, reaching from ultraviolet (about 190 nm) to far infrared (about 3000 nm). In addition also light conditions, and spectral distribution, typically change during the day, and also change from season to season. Parts of the light available can be used to convert into electrical power, such as by using solar (or PV–) cells. Photovoltaic solar panels absorb sunlight as the source of energy to generate a direct current. Typically solar cells are provided in larger units, such as a photovoltaic module, which is a packaged, connected assembly of photovoltaic solar cells. A special type of solar cells are bifacial solar cells. Bifacial solar modules offer advantages over traditional solar panels. Clearly power can be produced from both sides of a bifacial module, thereby increasing total energy generation, nowadays up to 30% more. They are often more durable as both sides are UV resistant, and potential-induced degradation is reduced when the bifacial module is frameless. Balance of system costs are also reduced when more power can be generated from bifacial modules in a smaller array footprint. In order to optimize performance, and to measure performance knowledge of the spectral distribution of the available light, so-called albedometers can be used. However, the prior art spectrophotometers are typically relatively large in size and expensive. For instance a pyranometer may be used; it can accurately measure broadband irradiance, but unfortunately has no spectral selectivity, and very low directional information. In an alternative a calibrated Si PV-cell could be used. Irradiance measured with a Si reference cell is however influenced by spectral effects. Information on the incoming spectrum is thus desired to obtain the real irradiance information.

It is noted that solar cell outputs show nontrivial variation with changing spectra. This may especially be the case for multi-junction solar cells, due to their increased spectrum sensitivity from current mismatch effects. Therefore, information about incoming solar spectrum is desired in order to accurately determine the yield of solar cells or modules and to optimize said yield.

In "A Comparison of Satellite-Derived Spectral Albedos to Ground-Based Broadband Albedo Measurements Modeled to Satellite Spatial Scale for a Semidesert Landscape", Lucht et al., October 2000, Remote Sensing of Environment 74(1):85-98, DOI: 10.1016/S0034-4257(00)00125-5, the use of ground-based albedometer measurements for validating albedo measurements acquired from space at the 1-km spatial resolution of Moderate Resolution Imaging Spectroradiometer (MODIS). This work forms an element of the Grassland Prototype Validation Exercise initiative. They calculate spectral albedo through the multiangular inversion of a semiempirical bidirectional reflectance distribution function model and perform narrowband-to-broadband albedo conversion using an observed spectrum as interpolator and extrapolator of spectral albedo. This may be regarded as a classical albedometer approach. In "Comparison of Bifacial Solar Irradiance model Predictions with Field Validation" Pelaez et al, IEEE J. Photovoltaics, Vol. 9, No. 1, p. 82-88, recite that Models predicting rear irradiance for bifacial systems are considered critical to establish accurate estimates of energy yield. They compare five published bifacial irradiance models, varying clearance, row spacing, tilt, and albedo to measure the sensitivity to these parameters. Bifacial energy gains (BGE) as high as 20% are predicted for some configurations. Model agreement is generally good for low ground clearance (clearance heights lower than 0.75 times the collector width), but at higher clearances, finite system size and edge effects become a significant factor in simulations, stretching assumptions of infinite system extent made in some models. In addition, rear irradiance uniformity is improved at high ground clearance, as expected. A test-bed construction and results are described for comparison between modeled and measured data in Golden, CO, USA. The investigations indicate that model agreement for BGE calculation is better than 2% (absolute) when compared with measured results, depending on the system configuration.

The present invention therefore relates to an improved albedometer, which solves one or more of the above problems and drawbacks of the prior art, providing reliable results, without jeopardizing functionality and advantages.

SUMMARY OF THE INVENTION

It is an object of the invention to overcome one or more limitations of the prior art and provides an improved albedometer, which provides both spectral resolution and geometric resolution. Thereto a geometrically and spectrally resolved albedometer for a PV-module is provided, comprising a spectrophotometer for spectrally resolving light comprising at least two arrays of n*m size comprising at least two spaced apart photo-detecting cells, such as solar cells, each solar cell adapted to receive direct or reflected solar light, respectively, and providing an electrical signal in response thereto, and each individually adapted to receive a bandwidth of wavelength, wherein the bandwidth is <300 nm, wherein bandwidths preferably do not overlap, wherein $n \geq 1$ and $m \geq 2$, preferably $n \geq 2$, more preferably $n \in [3, 2^{10}]$, and preferably $m \geq 3$, more preferably $m \in [4, 2^{12}]$, even more preferably $m \in [8, 2^{10}]$, wherein n and m may be selected independently for each array, the spectrophotometer receiving light in a first and second direction, that is at least one first array of the spectrophotometer receiving light in a first direction and at least one second array of the spectrophotometer receiving light in a second direction, wherein the first and second direction are opposite, a 3D image forming device, such as an optical camera, a LIDAR system, or a combination thereof, the 3D image forming device receiving an image of reflected light in the second direction, and an electronic circuit for processing the individual electrical signals and for mapping spectrally resolved light and the 3D-image on top of one and another, preferably wherein the spectrophotometer, the 3D image forming device, and the electronic circuit are incorporated in the albedometer. It is noted that instead of a solar cell, or in combination with a solar cell, also a photo-diode can be used. A suited photo-diode can have similar characteristics as the present solar cell. So with the term "solar cell" also an equivalent photo-diode, or likewise equivalent photo-detector, is included.

In a second aspect the present invention relates to a method of determining characteristics of reflected light comprising providing an albedometer according to the invention, providing a bi-facial PV-module, measuring the reflected light over a period of time, and geometrically and spectrally resolving the measured reflected light.

In a third aspect the present invention relates to a method of optimizing reflected light performance of a solar cell, comprising determining reflected light, predicting energy yield of a to be developed PV-module, and optimizing said energy yield by adapting a reflector at a backside of the PV-module, or by providing a tandem solar cell, and combinations thereof, such as by physically manipulating a surface colour and/or a surface texture.

In a fourth aspect the present invention relates to a method of measuring a combined geometrical and spectral distribution, comprising providing an albedometer according to the invention, measuring light over a period of time, and spectrally resolving the measured reflected light.

In a fifth aspect the present invention relates to a computer program for geometrically and spectrally resolving light comprising instructions, loaded on at least one computer or in an electronic circuit, for carrying out the following steps: measuring the reflected light over a period of time, and geometrically and spectrally resolving the measured reflected light.

In a sixth aspect the present invention relates to a bifacial PV-module or system of PV-modules comprising on a backside thereof at least one albedometer according to the invention.

Advantages of the present description are detailed throughout the description.

DETAILED DESCRIPTION OF THE INVENTION

In an exemplary embodiment the present albedometer may further comprise stored on the albedometer a light intensity/response curve for each solar cell.

In an exemplary embodiment of the present albedometer each solar cell may be the same, and wherein each solar cell is provided with a filter for the respective bandwidth, or wherein each solar cell is adapted to respond to light within the bandwidth, or a combination thereof.

In an exemplary embodiment of the present albedometer a central wavelength of a bandwidth of a first solar cell may be 470±20 nm.

In an exemplary embodiment of the present albedometer a central wavelength of a bandwidth of a second solar cell may be 980±20 nm.

In an exemplary embodiment of the present albedometer a central wavelength of a bandwidth of a third solar cell may be 900±20 nm.

In an exemplary embodiment of the present albedometer a central wavelength of a bandwidth of a fourth solar cell may be 850±20 nm.

In an exemplary embodiment of the present albedometer a central wavelength of a bandwidth of a fifth solar cell may be 1170±20 nm.

In an exemplary embodiment of the present albedometer a central wavelength of a bandwidth of a sixth solar cell may be 785±20 nm.

In an exemplary embodiment of the present albedometer a central wavelength of a bandwidth of a seventh solar cell may be 705±20 nm.

In an exemplary embodiment of the present albedometer a central wavelength of a bandwidth of a eight solar cell may be 675±20 nm.

In an exemplary embodiment of the present albedometer a central wavelength of a bandwidth of a ninth solar cell may be 630±20 nm.

In an exemplary embodiment of the present albedometer a central wavelength of a bandwidth of a tenth solar cell may be 360±20 nm.

In an exemplary embodiment of the present albedometer a central wavelength of a bandwidth of a eleventh solar cell may be 550±20 nm.

In an exemplary embodiment of the present albedometer a central wavelength of a bandwidth of a twelfth solar cell may be 1050☐20 nm.

In an exemplary embodiment of the present albedometer may comprise a combination of the above solar cells.

In an exemplary embodiment of the present albedometer the array may comprise 4-12 solar cells, preferably 6-8 solar cells. In an exemplary embodiment of the present albedometer solar cells are placed apart at a distance of >1 mm, such as 0.5-5 cm.

In an exemplary embodiment of the present albedometer solar cells may have a size of $1*1$ mm$^2$ to $10*10$ cm$^2$.

In an exemplary embodiment the present albedometer may further comprise stored on the albedometer at least one spectral light intensity distribution of a reflecting surface, underneath the PV-panel). The distributions may reflect that a surface beneath the PV-module may consist of various materials, each one thereof having a different spectral reflectivity; thereto, for each one of these, a distribution may be stored.

In an exemplary embodiment the present albedometer may further comprise stored on the albedometer at least one spectral light intensity distribution of incoming light, preferably a spectral light intensity distribution of every day of a year, more preferably a spectral light intensity distribution of every minute of every day of a year, preferably adapted for a given latitude.

The stored distribution may be considered to be a library of distributions, comprising thousands or more of distributions.

In an exemplary embodiment the present albedometer may further comprise an optical transparent casing (4), preferably wherein the spectrophotometer, and electronic circuit, are embedded in said casing, to provide as low as possible shading on the surface beneath the PV module. In this is way the accuracy of the albedometer increases, as the effect of measurement device on the light in interaction is minimized.

In an exemplary embodiment the present albedometer may further comprise a temperature controller for adjusting the albedometer. In order to improve accuracy, the present albedometer may have a temperature correction. This could be a further element, or use could be made of the solar cells, as the temperature of the cells can be estimated from their voltage, such as while it measures the irradiance by reading the cells current. By knowing the temperature, a correction may be applied.

In an exemplary embodiment the present albedometer may further comprise a level sensor (5).

In an exemplary embodiment the present albedometer may further comprise a mounting structure (6).

In an exemplary embodiment the present albedometer may further comprise a connector (8), such as an USB connector.

In an exemplary embodiment the present albedometer may further comprise a location sensor.

In an exemplary embodiment the present albedometer may further comprise a pressure sensor.

In an exemplary embodiment the present albedometer may further comprise a timer.

By knowing the air mass, the accuracy of the albedometer can be further increased. To establish the air mass, location and time are typically needed. Therefore, in the electric circuitry a GPS sensor is also included.

In an exemplary embodiment the present albedometer may further comprise at least one optical diffuser located over the at least one array.

In an exemplary embodiment of the present albedometer each solar cell may individually be adapted to receive low intensity light, preferably from 1-400 W/m$^2$, more preferably from 5-200 W/m$^2$, such as from 10-100 W/m$^2$.

In an exemplary embodiment of the present albedometer the spectrophotometer, the 3D image forming device, and the electronic circuit are incorporated in the albedometer.

The invention will hereafter be further elucidated through the following examples which are exemplary and explanatory of nature and are not intended to be considered limiting of the invention. To the person skilled in the art it may be clear that many variants, being obvious or not, may be conceivable falling within the scope of protection, defined by the present embodiments.

DETAILED DESCRIPTION OF FIGURES

The figures are detailed throughout the description, and specifically in the experimental section below.

Figure 1:
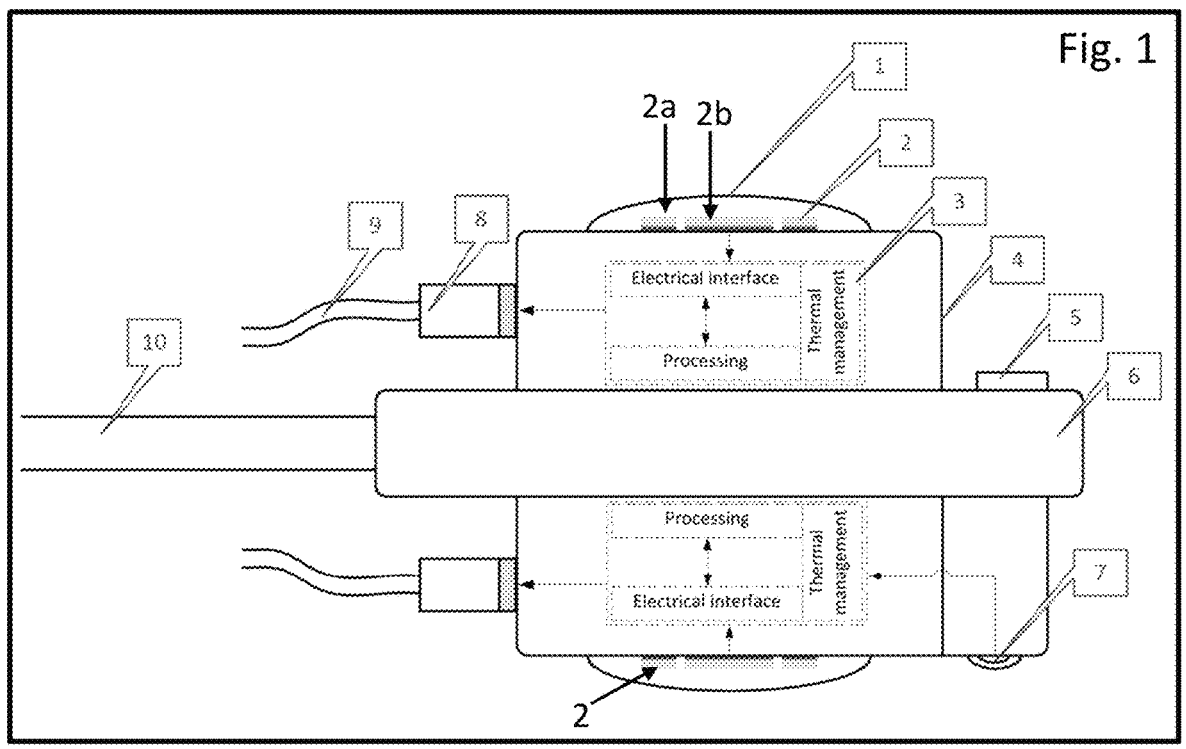
FIGS. 1-6 show details of the present invention.

In the figures:
100 Albedometer
1 diffuser, e.g. glass dome
2 array of PV-cells
2a optical bandwidth filter
2b PV cell
3 Internal circuitry
4 Casing
5 Level sensor
6 Mounting structure
7 3D scanning camera
8 Connector/signal converter
9 cable
10 mounting arm
FIG. 1 shows a schematic view of the invention.

Figure 2:
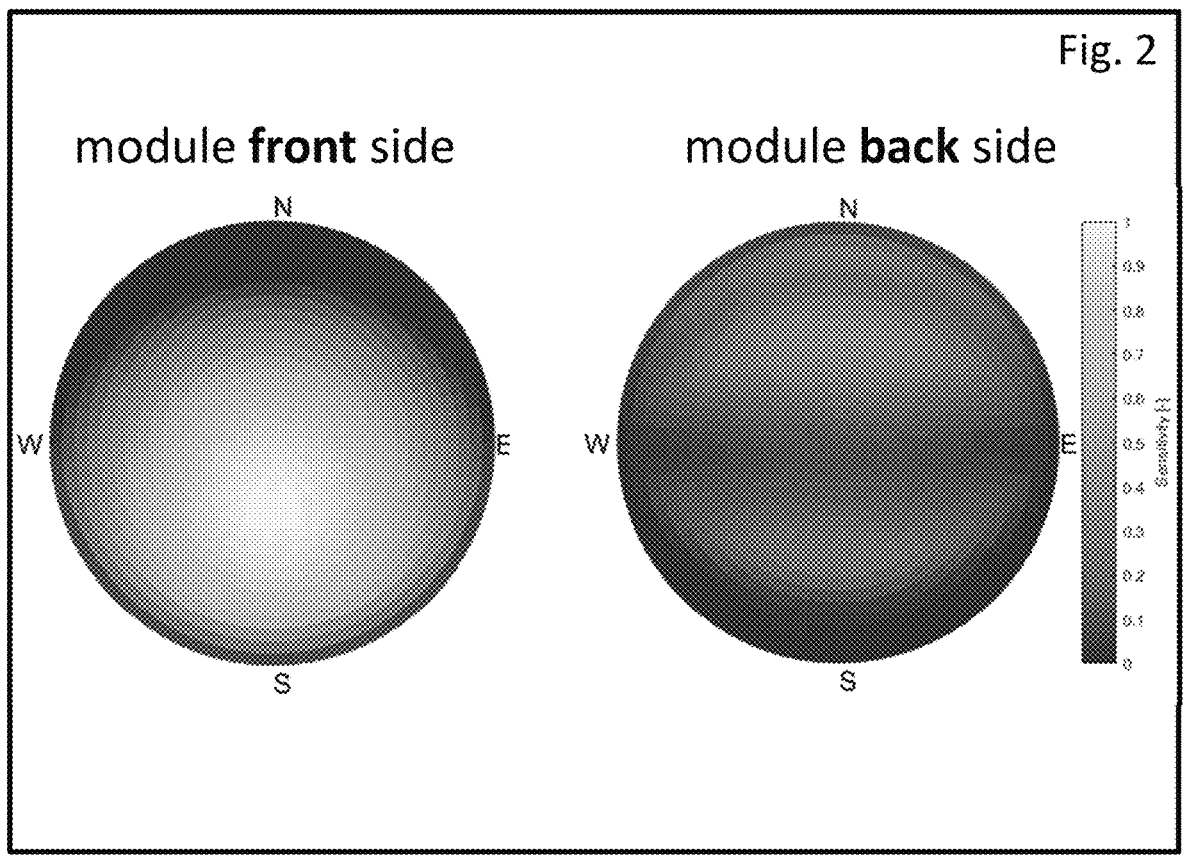

FIG. 2 shows the sensitivity of the front and back side of a bifacial PV module to the irradiance coming from surrounding.

Figure 3:
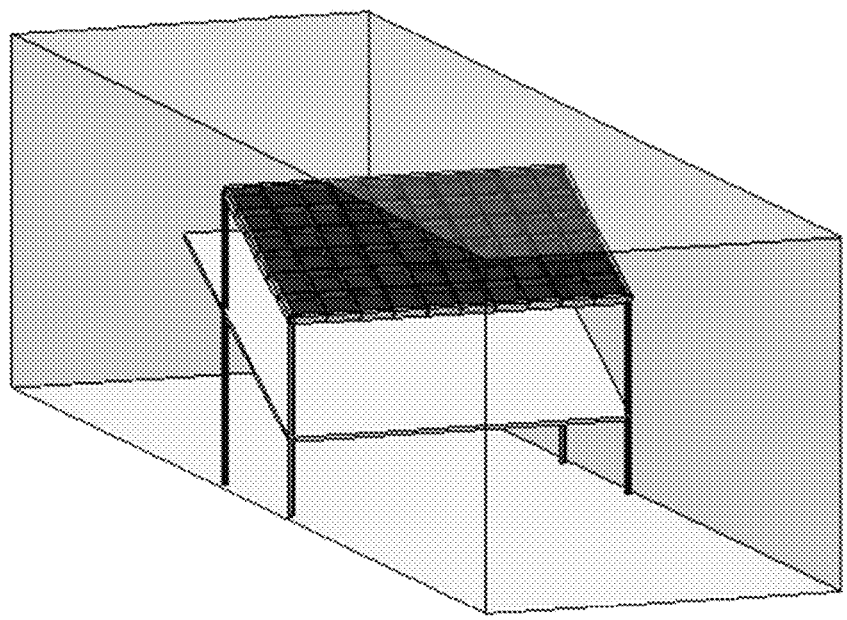

FIG. 3 shows an example of placing a white/diffuse reflector beneath a bifacial PV module to increase its yield.

Figure 4:
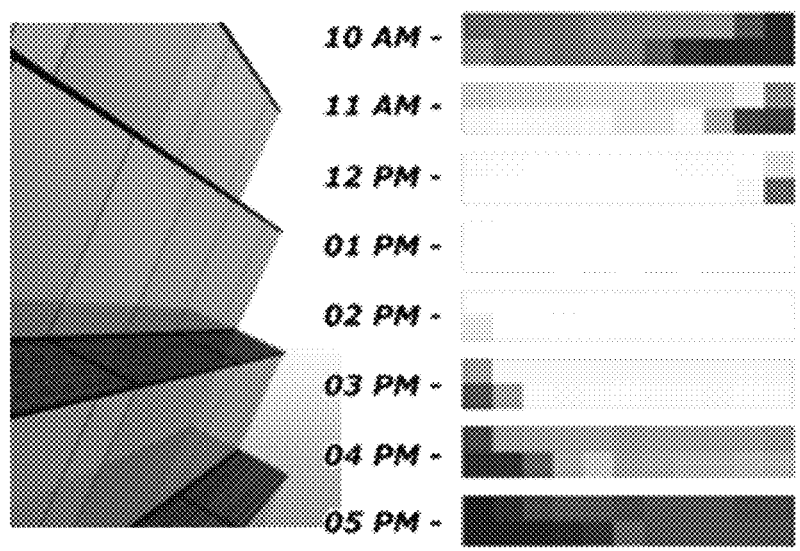

FIG. 4, shows an example of irregular distribution of irradiance over a surface of PV module placed at the façade of a building having mirrors as reflectors.

Figure 5:
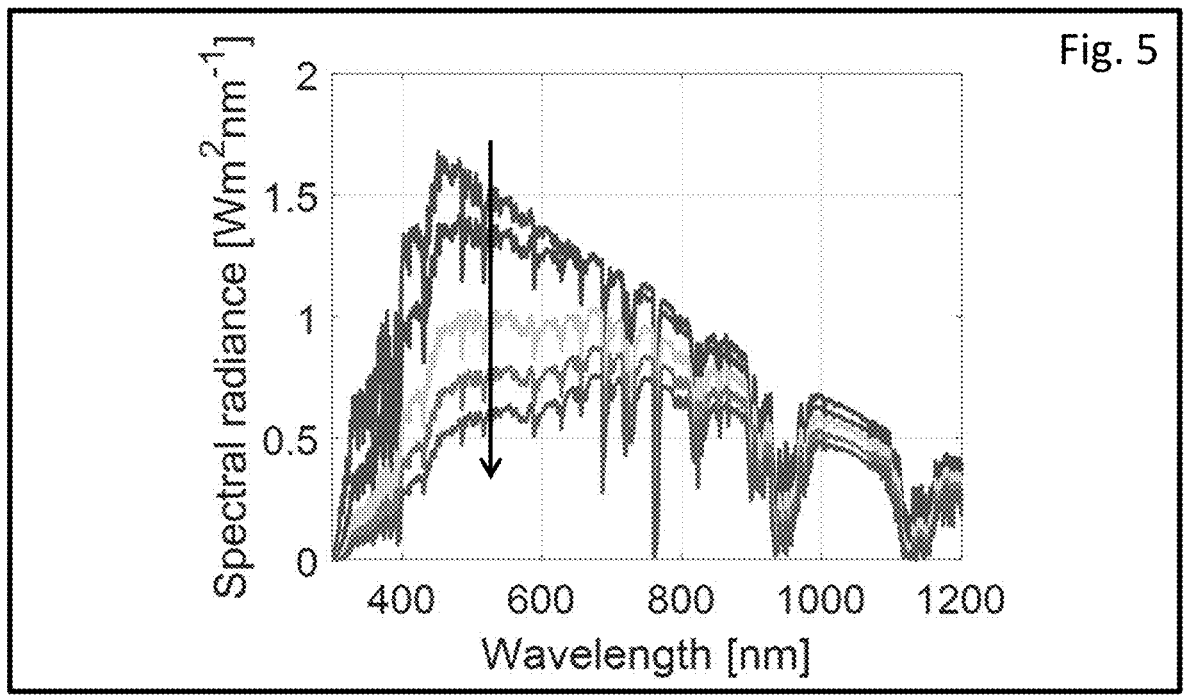

FIG. 5, shows the changes in the irradiance coming from sky at various air mass condition (or from noon to evening) which cause the red-shift the light spectrum.

Figure 6:
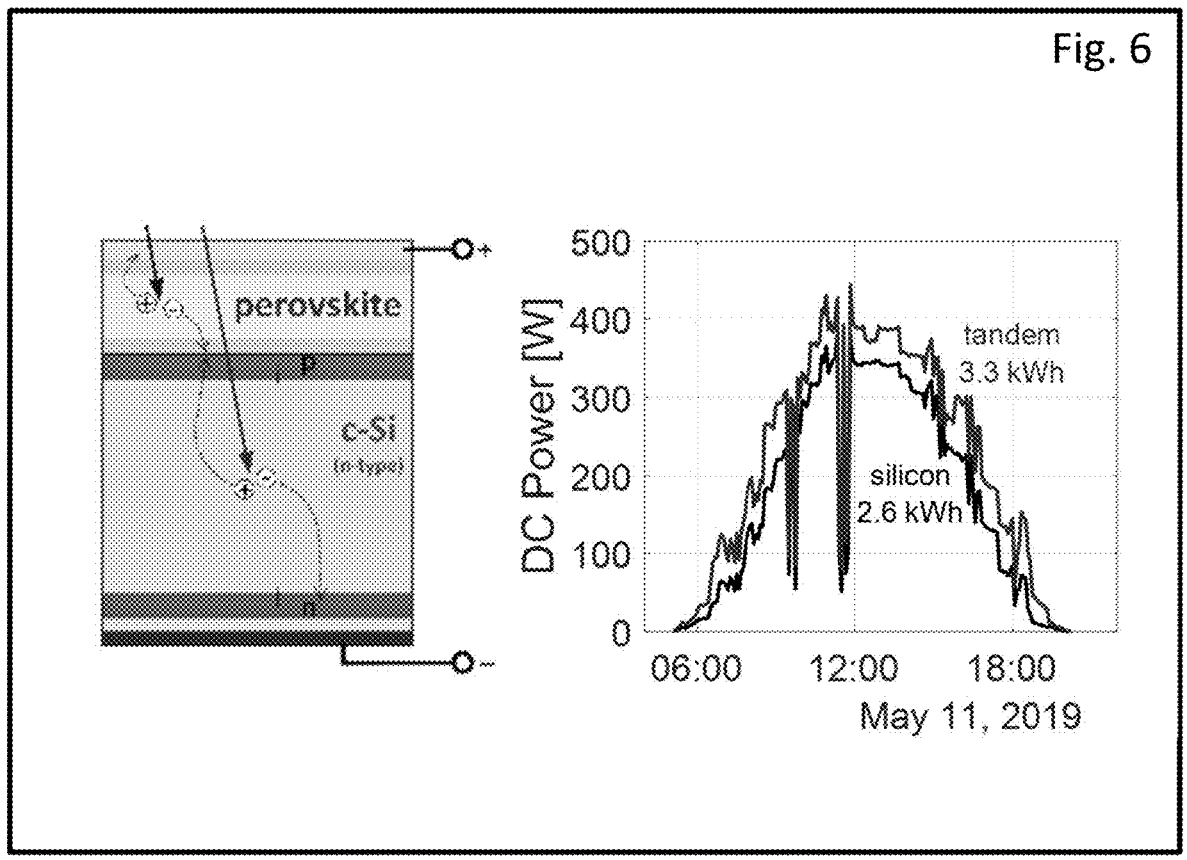

FIG. 6, shows how changing the spectrum of light during a day causes different responses for layers of a tandem PV cell.

The invention claimed is:

1. A geometrically and spectrally resolved albedometer for a bifacial PV-module comprising
a spectrophotometer for spectrally resolving light comprising at least two arrays of n*m size comprising at least two spaced apart solar cells, each solar cell adapted to receive direct or reflected solar light, respectively, and providing an electrical signal in response thereto, and each individually adapted to receive a bandwidth of wavelength, wherein the bandwidth is <300 nm, wherein bandwidths do not overlap, wherein n≥1 and m≥3, at least one first array of the spectrophotometer receiving light in a first direction and at least one second array of the spectrophotometer receiving light in a second direction, wherein the first and second direction are opposite,
a 3D image forming device, the 3D image forming device receiving an image in a second direction,
and
an electronic circuit for processing the individual electrical signals and for mapping spectrally resolved light and the 3D-image on top of one and another.

2. The geometrically and spectrally resolved albedometer according to claim 1, further comprising stored on the albedometer a light intensity-response curve for each spaced apart solar cell.

3. The geometrically and spectrally resolved albedometer according to claim 1, wherein each spaced apart solar cell is the same, and wherein each spaced apart solar cell is selected from a solar cell provided with a filter for the respective bandwidth, a solar cell is adapted to respond to light within the bandwidth, and a combination thereof.

4. The geometrically and spectrally resolved albedometer according to claim 1, wherein a central wavelength of a bandwidth of a spaced apart solar cell is selected from 470±20 nm, from 980±20 nm, from 900±20 nm, from 850±20 nm, from 1170±20 nm, from 785±20 nm, from 705±20 nm, from 675±20 nm, from 630±20 nm, from 360±20 nm, from 550±20 nm, from 1050±20 nm, and combinations thereof.

5. The geometrically and spectrally resolved albedometer according to claim 1, wherein the array comprises 4-12 solar cells, and
wherein solar cells are placed apart at a distance of >1 mm, and
wherein solar cells have a size of 1*1 mm$^2$ to 10*10 cm$^2$.

6. The geometrically and spectrally resolved albedometer according to claim 1, further comprising stored on the albedometer at least one spectral reflected light intensity distribution of a reflecting surface, and
further comprising stored on the albedometer at least one spectral light intensity distribution of incoming light.

7. The geometrically and spectrally resolved albedometer according to claim 1, comprising
- an optical transparent casing, wherein the spectrophotometer, and electronic circuit, are embedded in said casing, and
- a temperature controller for adjusting the albedometer, and
- a location sensor, and
- a level sensor, and a mounting structure, and
- a connector, and
- a pressure sensor, and
- a timer, and
- at least one optical diffuser located over the at least one array.

8. The geometrically and spectrally resolved albedometer according to claim 1, wherein each solar cell is individually adapted to receive low intensity light from 1-400 W/m$^2$.

9. A bifacial PV-module comprising at least one geometrically and spectrally resolved albedometer according to claim 1, the geometrically and spectrally resolved albedometer comprising
- a spectrophotometer for spectrally resolving light comprising at least two arrays of n*m size comprising at least two spaced apart solar cells, each solar cell adapted to receive direct or reflected solar light, respectively, and providing an electrical signal in response thereto, and
- each individually adapted to receive a bandwidth of wavelength, wherein the bandwidth is <300 nm, wherein bandwidths do not overlap, wherein n≥1 and m≥3, at least one first array of the spectrophotometer receiving light in a first direction and at least one second array of the spectrophotometer receiving light in a second direction, wherein the first and second direction are opposite,
- a 3D image forming device, the 3D image forming device receiving an image in a second direction, and
- an electronic circuit for processing the individual electrical signals and for mapping spectrally resolved light and the 3D-image on top of one and another.

10. A method of determining characteristics of reflected light comprising providing a geometrically and spectrally resolved albedometer, the geometrically and spectrally resolved albedometer comprising
- a spectrophotometer for spectrally resolving light comprising at least two arrays of n*m size comprising at least two spaced apart solar cells, each solar cell adapted to receive direct or reflected solar light, respectively, and providing an electrical signal in response thereto, and each individually adapted to receive a bandwidth of wavelength, wherein the bandwidth is <300 nm, wherein bandwidths do not overlap, wherein n≥1 and m≥3, at least one first array of the spectrophotometer receiving light in a first direction and at least one second array of the spectrophotometer receiving light in a second direction, wherein the first and second direction are opposite,
- a 3D image forming device, the 3D image forming device receiving an image in a second direction, and
- an electronic circuit for processing the individual electrical signals and for mapping spectrally resolved light and the 3D-image on top of one and another,
- providing a bi-facial PV-module, measuring the reflected light over a period of time, and geometrically and spectrally resolving the measured reflected light.

11. The method of determining characteristics of reflected light according to claim 10, further comprising, predicting energy yield of a to be developed PV-module, and optimizing said energy yield by one or more of adapting a reflector at a backside of the PV-module, and providing a tandem solar cell.

12. The method of determining characteristics of reflected light according to claim 11, wherein adapting reflectance of a reflective surface is by physically manipulating a surface colour and a surface texture.

13. A computer program for carrying out the method of determining characteristics of reflected light according to claim 10 loaded on a device selected from a computer and an electronic circuit, by instructing the geometrically and spectrally resolved albedometer for carrying out the following steps:
- measuring the reflected light over a period of time, and geometrically and spectrally resolving the measured reflected light.

* * * * *